(No Model.) 2 Sheets—Sheet 1.

E. A. WRIGHT.
CULTIVATOR.

No. 259,626. Patented June 13, 1882.

Attest.
Sidney P. Hollingsworth
Newton Wyckoff

Inventor.
Edgar A. Wright
By his atty
Philip T. Dodge (No Model.) 2 Sheets—Sheet 2.

E. A. WRIGHT.
CULTIVATOR.

No. 259,626. Patented June 13, 1882.

Attest.
Sidney P. Hollingsworth
Newton Wyckoff

Inventor.
Edgar A. Wright
By his atty
Philip T. Dodge

UNITED STATES PATENT OFFICE.

EDGAR A. WRIGHT, OF MOLINE, ILLINOIS.

CULTIVATOR.

SPECIFICATION forming part of Letters Patent No. 259,626, dated June 13, 1882.

Application filed April 6, 1882. (No model.)

*To all whom it may concern:*

Be it known that I, EDGAR A. WRIGHT, of Moline, in the county of Rock Island and State of Illinois, have invented certain Improvements in Cultivators, of which the following is a specification.

My invention relates to what are commonly known in the art as "walking straddle-row cultivators," wherein a wheeled frame or axle, arched at the middle to pass over the standing corn, is provided at its two ends with sustaining-wheels and with rearwardly-extending beams, the latter being provided with shovels to enter the ground, and being jointed at their forward ends to the frame in such manner that they may swing both laterally and vertically.

The invention relates to an improved manner of constructing the frame and applying the springs for the purpose of raising or assisting the operator to raise the beams or drag-bars, the springs having in some cases the additional function of holding the shovels to their proper places in the ground.

The improvement consists mainly in providing the frame with axles capable of rotating independently of the wheels, coupling the wheels directly to said axles, and providing the axles with arms arranged to co-operate with a spring, a weight, or with draft devices to which the team is attached, as hereinafter more fully explained.

As regards the combination of the loosely-revolving axles with the beams and lifting-springs or other equivalents, the invention is designed more particularly as an improvement upon those machines in which the axle is stationary and the beams and springs combined with sleeves or coupling-boxes arranged to rotate upon the axles.

One of the primary objects of the invention is to avoid the use of the rotating sleeves or boxes mounted upon the axle, which, for various reasons unnecessary to detail, are open to serious objection.

The apparatus is susceptible of modifications, which will be hereinafter described more fully, without changing its mode of action or departing from the spirit of the invention.

Figure 1:
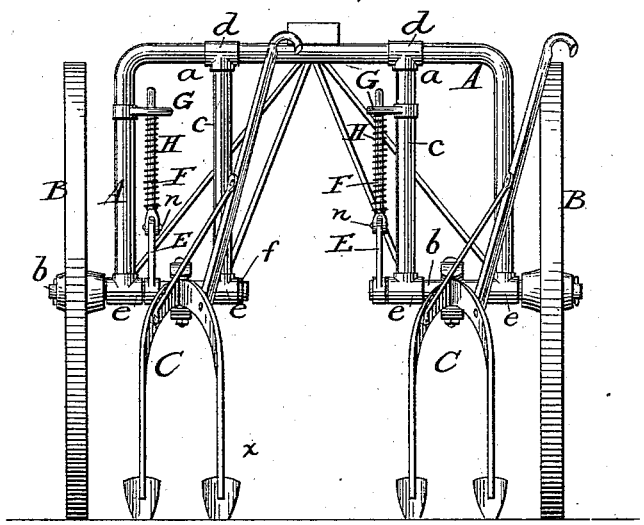
Figure 2:
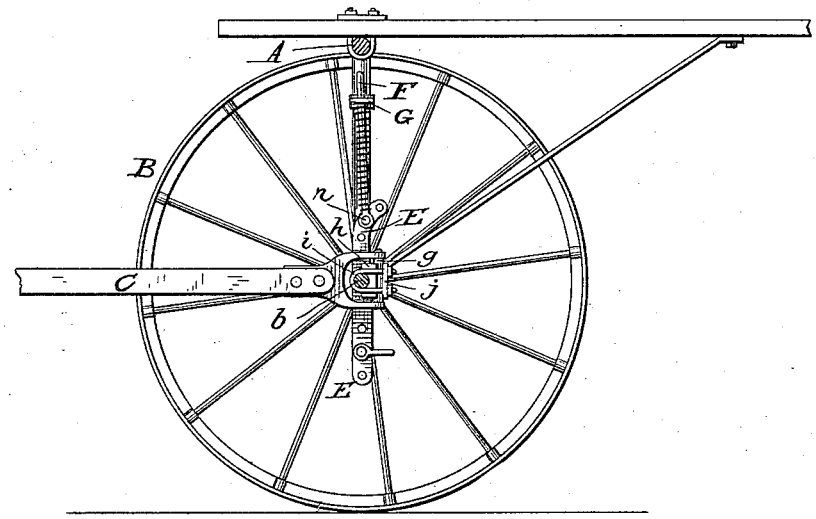
Figure 3:
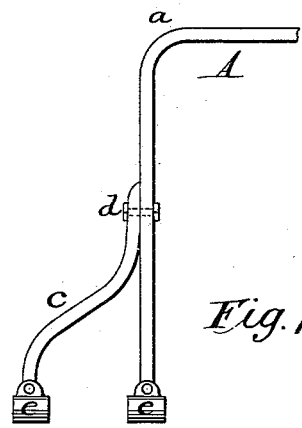
Figure 4:
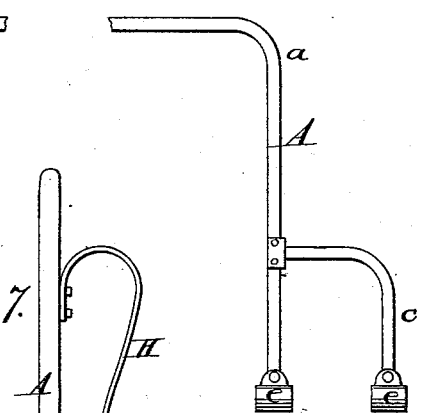
Figure 7:
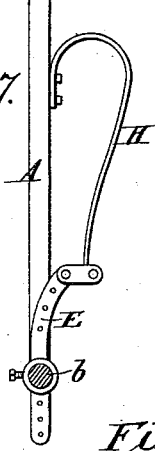
Figure 8:
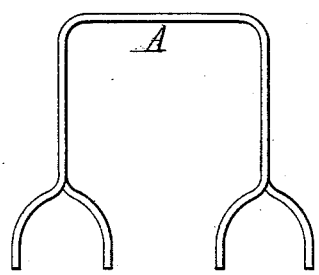
Figure 5:
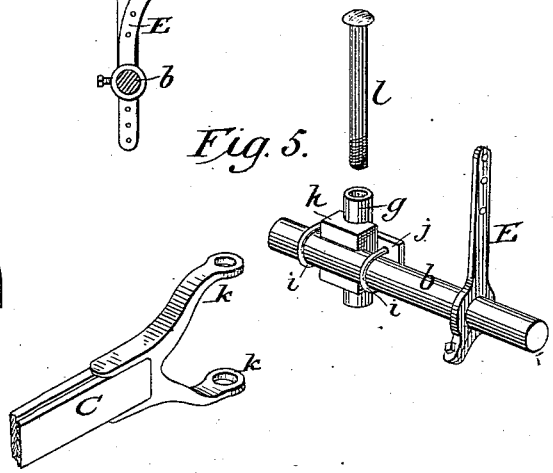
Figure 6:
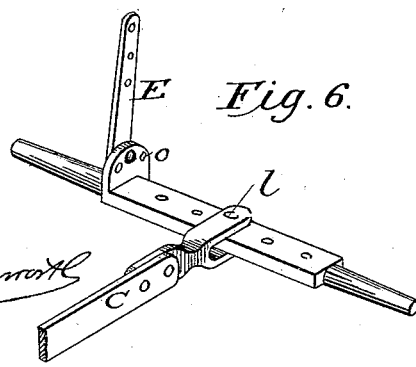

Referring to the accompanying drawings, Figure 1 represents a rear elevation of my improved machine. Fig. 2 is a longitudinal vertical section through the same on the line $x\,x$. Figs. 3 and 4 are views of the frame in a modified form. Fig. 5 is a perspective view on an enlarged scale, showing one method of coupling the beam to the rotary axle. Fig. 6 is a perspective view illustrating another form of the axle and coupling devices. Fig. 7 is a side elevation, showing a modified manner of connecting the spring with the axle. Fig. 8 is an elevation of the main frame in a modified form.

The essential feature of the invention consists in coupling the plow-beam to the axle in such manner that the rotation of the axle will serve to raise or lower the beam, and in connecting with the axle thus arranged a spring, or a draft device, or both, in such manner that they will tend to turn the axle, and thereby control the position of the beam, and so long as this combination is retained the details may be modified as desired, the drawings illustrating the preferred construction.

While the improvements are designed mainly for use in walking-cultivators, they may be applied with equal advantage to machines which are provided with seats whereon the driver or attendant is carried.

Referring to the drawings, A A represent the main arched frame, consisting of a bar or rod of steel, iron, or iron pipe, $a$, bent into an inverted-U form, two short horizontal axles, $b$, connected to the lower ends of the arch $a$, and two upright braces, $c$, extending from the upper part of the arch $a$ downward within the same to the inner ends of the axle $b$. The depending arms of the arch $a$ and the standards $c$ are located at such distances apart as to admit of the plow-beams being coupled between them, and the axles $b$ are made of such length as to extend from the standards $c$ outward beyond the arch $a$ a sufficient distance to receive the ground-wheels B upon their outer ends.

The standards $c$ are preferably connected to the upper part of the arch by means of T-shaped couplings $d$, and at their lower ends the standards $c$ and arch $a$ are both provided with boxes or bearings $e$, through which the axles $b$ pass loosely, so that they may rotate freely therein. The bearings $e$ are preferably made in a T form, with upright necks screwed firmly upon the lower threaded ends of the arch a and standards c; but they may be made in any other suitable form and secured by bolting, riveting, or in any other suitable manner.

The wheels B are mounted loosely upon the outer ends of the respective axles and are free to turn thereon, the axles being thus free to turn independently of the wheels and of the frame. The wheels will be secured upon the axles by linchpins or collars at the outer ends, as usual, and the axles will be prevented from sliding endwise by providing them with collars or pins f, or in any other suitable manner. To the loose axles thus arranged I connect the plow-beams C by any ordinary or suitable coupling which will compel them to turn vertically with the axles, but permit them to swing laterally independently of the axles. The coupling shown in Figs. 2 and 5 is found to answer a good purpose. It consists of a short vertical tube, g, seated in and clamped firmly against a block, h, which is in turn seated upon the axle. The parts are bound firmly together by means of a staple-bolt, i, encircling the axle and passing through plate j, applied to the front of the tube.

The plow-beam is provided at is forward end with a forked coupling-head, having its two arms, k, connected to the upper and lower ends of the tube g, by means of a vertical pin or bolt, l. When the parts are thus connected the beam may swing laterally with perfect freedom, but may be swung upward and downward by revolving the axle with which it is compelled to move.

To each axle I secure rigidly, either at the inner or outer end or near the middle, a rigid arm, E, designed to co-operate with a spring or draft device. The arm may be extended upward to co-operate with a spring or downward from the axle to co-operate with a draft device, or both, as preferred. In Figs. 1 and 2 the upwardly-extending arms E are pivoted to the lower ends of rods F, the latter having their upper ends arranged to slide through guide-plates G, secured firmly to the main frame.

Spiral springs H are mounted upon and around the rods F, and bear upon collars on the lower ends of the same, thereby urging the rods downward.

The parts are so adjusted with reference to each other that when the beam is lowered to an operative position the sliding rod and the arm upon the axle will stand substantially in line with each other, as represented in Fig. 2, in which position the spring has little or no effect upon the beam. On commencing to elevate the beam it causes the axle to turn forward, the latter in turn swinging the arm E forward, so that the spring-actuated rod and the arm are thrown out of line, whereupon the rod, urged downward by the spring, tends to urge the arm E forward to rotate the axle, and thereby elevate the beam.

If desired, the arm E may be arranged in such relation to the beam and the sliding rod that the connecting-pivot n will be thrown backward "past the center," in which event the action of the spring upon the beam will be changed from a lifting to a depressing action, so as to hold the shovels in the ground when the machine is in action.

In order to permit the force of the spring and the point at which it ceases its elevating action to be varied, the arm E may be made adjustable upon the axle in any suitable manner; or the arm may be provided in its upper end with a series of holes, as shown in Fig. 2, to admit of the pivotal action of the rod being moved forward or backward.

Instead of employing the spiral spring and sliding rod, a curved spring, such as shown in Fig. 7, may be bolted to the main frame at its upper end, and connected at its lower end by a link or otherwise with the upper end of the arm E; or, in place of this arrangement, a spring of any other suitable form may be connected in any other suitable manner with the arm E, provided it tends to move the same forward to elevate the beam. Figs. 2 and 7 show the arm E extended downward below the axle, and provided with a series of holes, into either of which a draft device may be connected, so that the strain exerted by the team in moving the machine forward will tend to turn the axle backward, and thereby hold the beam in the ground. When this arrangement is used a spring may be employed, which exerts a constant and strong tendency to lift the beam without danger of the shovels being lifted from the ground when the machine is in action.

The arm E may be perforated above the axle as well as below to permit the attachment of the draft devices, in which case the draft of the team will tend to turn the axle forward and elevate the beams. The draft may be thus applied for the elevation of the beams, either alone or in connection with the spring attachment.

It is manifest that the form of the arm and the manner of securing the same to the axle may be modified to any extent desired.

Fig. 6 illustrates another form of coupling which may be employed to connect the beam with the axles. In this instance the beam is made of flat form, except at its ends, where it is rounded to fit the bearing of the frame. The end of the beam is provided with a forked coupling, which closely embraces the upper and lower faces of the axle, and which is connected thereto by means of a vertical pivot, l. The same figure also illustrates one method of applying the arm E so that it may be adjusted forward and backward, the arm being journaled loosely on one end of the axle and connected by a bolt with an upright flange formed on the axle, the flange being provided with a series of holes to admit of the arm being adjusted forward and backward.

Fig. 3 illustrates a modified form of the main frame, in which the supplemental braces or standards c are applied outside instead of inside of the arched portion a, the braces being in this case connected to the axle by couplings and to the arch by clamps or fastening devices d, which may be of any suitable form. Fig. 4 illustrates still another modified form of the frame, the parts being made of flat or bar iron, with the braces c applied outside of the arch and connected thereto by an intermediate plate bolted or riveted to the two parts. In both Figs. 3 and 4 the boxes e, at the lower ends of the frame, have the axle mounted loosely in them, in the same manner as represented in Fig. 1.

I am aware that a plow-beam having a forked head has been connected by a vertical pivot to a bearing formed solidly upon a coupling-head, and also similar devices formed solidly upon a draft-frame. This I do not claim. My invention in this regard consists mainly in supporting the vertical pivot in a tubular bearing secured adjustably to the axle by means of the clamping devices. An important feature attending my construction is the capability which it offers of adjusting the forward end of the beam vertically and laterally, which cannot be secured by either of the devices cited.

I do not claim herein the combination of the arch a, braces c, coupled thereto, and the T-shaped bearing having the loose axle mounted therein, the right being reserved to make said combination, as well as any and all other features which may be shown and described herein, but not specifically claimed, the subject of a separate application.

Having thus described my invention, what I claim is—

1. In a cultivator, the combination of the frame, the wheels, the two axles rotating independently of the frame and wheels, the plow-beams coupled to the axles, substantially as described, and the arms applied to the axle and adapted to co-operate with springs, weights, or draft devices, substantially as described.

2. The combination of the arched frame, the wheels, the independently-rotating axles, each provided with an arm, the spring attachments co-operating with the arms, substantially as described, and the beams connected with the axles, substantially as shown, to swing vertically therewith.

3. In a cultivator, the combination of a draft-frame, an axle revolving freely in said frame, a ground-wheel revolving freely on the axle, a plow-beam vertically pivoted to the axle, and an arm or projection, substantially as described, secured to the axle, and a spring-connection interposed between the frame and arm, substantially as described, for the purpose of acting through the arm and axle upon the beam.

4. The combination of the arched frame a and standards c, provided with the axle-bearings, the two independent loose axles, the two loose wheels, the two beams connected with the axles by vertical axes, the arms rigidly secured to the beams, the rods pivoted at one end to the arms and sliding at the opposite ends in guides, and the springs mounted on the rods, as shown.

5. In combination with the rotating axle and the beam having a forked head, the coupling consisting of the tube, the bearing-block between the tube and axle, the clamping devices, and the vertical pivot.

6. The combination of the draft-frame, the ground-wheels, the rotating axle, the beam connected with the axle by a vertical axis, and the arm secured rigidly to the axle and extending downward therefrom.

EDGAR A. WRIGHT.

Witnesses:
 EUGENE LEWIS,
 FRANK SMITH.